United States Patent [19]

Buckshaw et al.

[11] Patent Number: 5,425,543
[45] Date of Patent: Jun. 20, 1995

[54] SEAL ASSEMBLY FOR ROTATING SHAFT

[76] Inventors: Dennis J. Buckshaw, 42240 Crestview, Northville, Mich. 48167; James A. Clark, 7309 Manner Cir., #202, Westland, Mich. 48185

[21] Appl. No.: 123,339

[22] Filed: Sep. 17, 1993

[51] Int. Cl.⁶ ............................................. E21B 33/00
[52] U.S. Cl. ..................................... 277/3; 277/34.3; 277/53; 165/9
[58] Field of Search .................. 277/3, 34.3, 53; 165/9

[56] References Cited

U.S. PATENT DOCUMENTS

| | | | |
|---|---|---|---|
| 3,294,243 | 12/1966 | Cerles | 277/34.3 |
| 4,040,475 | 8/1977 | Stockman et al. | 165/9 |
| 4,372,371 | 2/1983 | Baber | 165/9 |
| 5,316,318 | 5/1994 | Veau | 277/53 |

FOREIGN PATENT DOCUMENTS 1488645  6/1989  U.S.S.R. .................. 277/3

*Primary Examiner*—A. Michael Chambers
*Attorney, Agent, or Firm*—Young, MacFarlane & Wood

[57] ABSTRACT

A seal assembly for use in precluding leakage of hot combustion products along the shaft of a rotating heat exchanger wheel utilized in a power plant. The seal assembly includes a housing positioned in surrounding relation to the shaft and defining an annular chamber around the shaft having an inboard end and an outboard end; a positive annular fluid seal with the shaft proximate the outboard end of the chamber; and a leakage annular fluid seal with the shaft proximate the inboard end of the chamber. The positive annular fluid seal comprises a packing ring surrounding the shaft and an annular bladder positioned in surrounding relation to the packing ring and constrained against radial enlargement so that the bladder expands radially inwardly in response to receipt of pressurized fluid to urge the packing ring into sealing engagement with the shaft. Pressurized air is delivered to the chamber for leakage past the inboard leakage seal by delivering primary incoming pressurized air for the boiler to the chamber so that the pressurized air may flow out of the chamber past the leakage seal to preclude the entry of hot dirty combustion products into the chamber along the shaft and thereby preclude the entry of the combustion products into the general environment of the plant.

8 Claims, 4 Drawing Sheets

U.S. Patent  June 20, 1995  Sheet 1 of 4  5,425,543
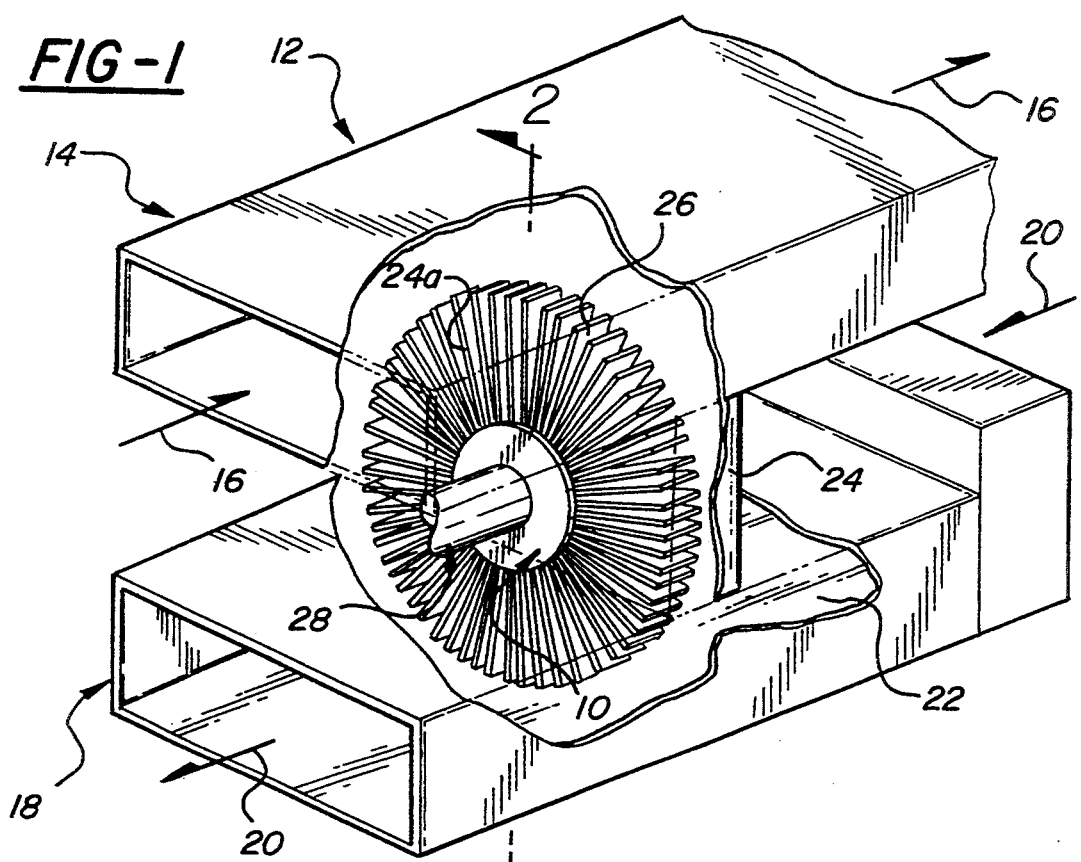
FIG-1
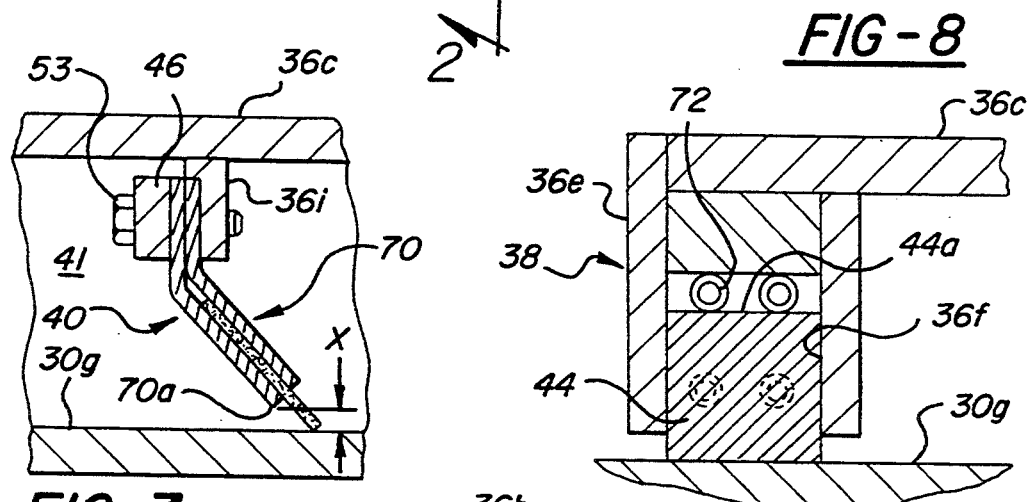
FIG-7
FIG-8
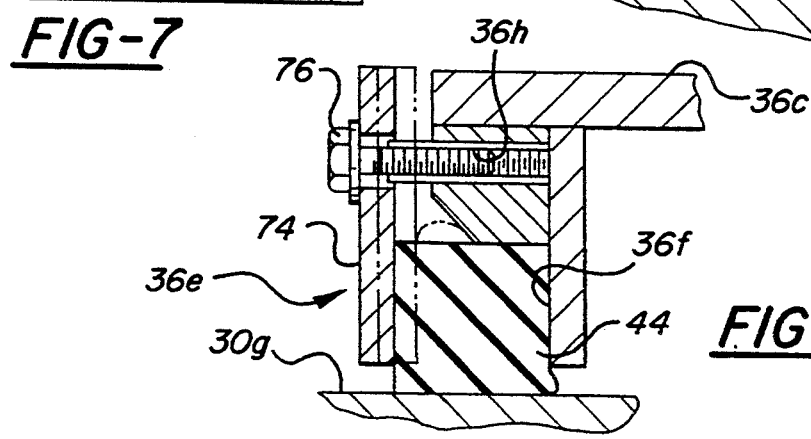
FIG-9

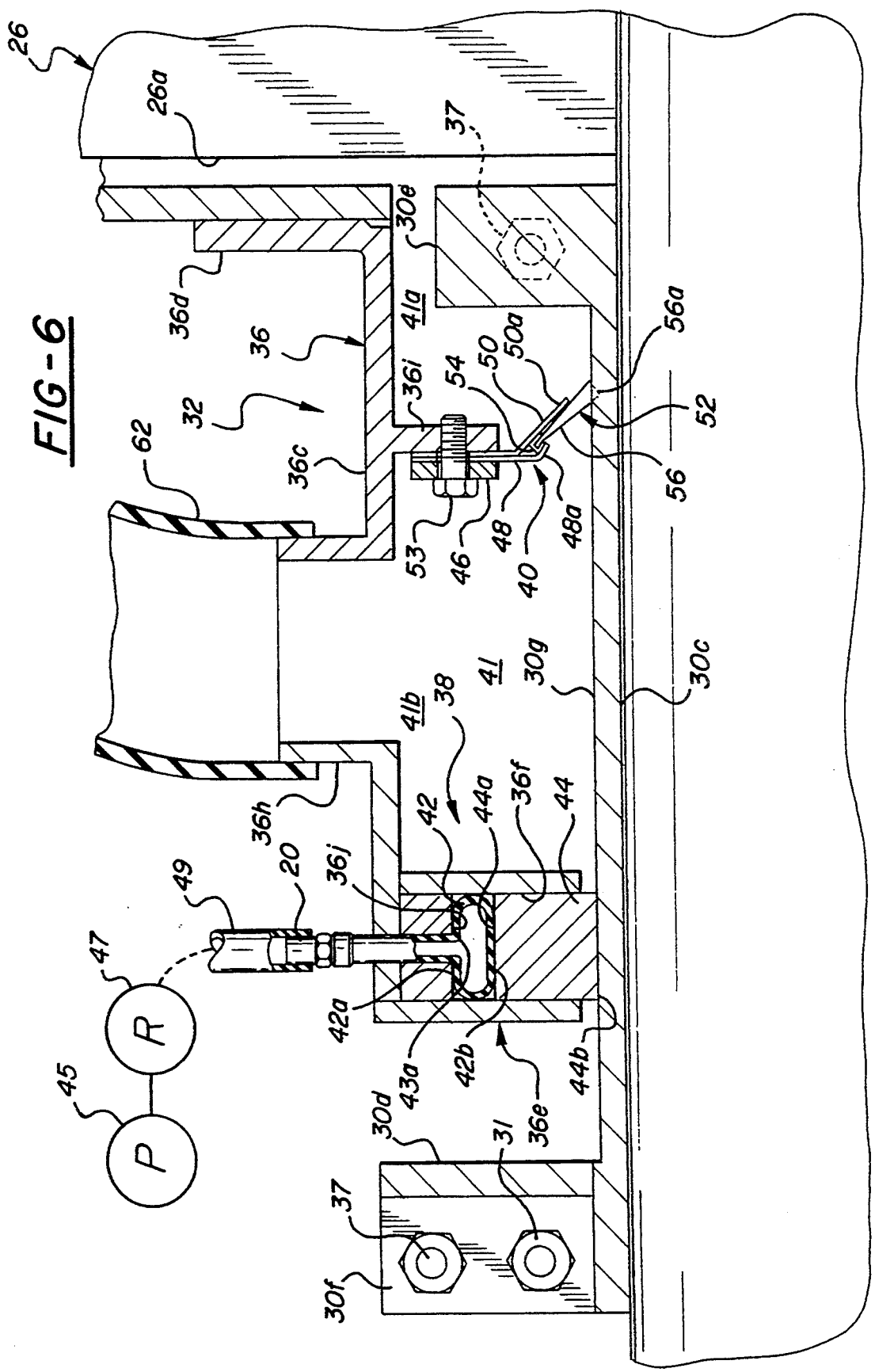

SEAL ASSEMBLY FOR ROTATING SHAFT

BACKGROUND OF THE INVENTION

This invention relates to a seal assembly for a rotating shaft and more particularly to a seal assembly for use with a heat exchanger of the type including a rotating shaft.

Shaft sealing is a problem whenever a rotating shaft is utilized in an assembly in which leakage along the shaft is detrimental to the environment in which the assembly is operating. For example, in a power plant utilizing a heat exchanger of the type including a large rotating wheel performing a heat exchange operation between hot combustion products leaving the boiler of the plant and cool incoming primary air being delivered to the boiler, it is critical to prevent the leakage of hot, dirty combustion products along the shaft of the wheel and into the general plant environment.

Many seal assemblies have been proposed for this purpose but these prior art seals have either been unduly complex and expensive and/or have failed to achieve a satisfactory seal.

SUMMARY OF THE INVENTION

This invention is directed to the provision of an improved seal assembly for a rotating shaft.

More specifically, this invention is directed to the provision of a shaft seal assembly that is especially suited for use with a heat exchanger of the type including a wheel mounted for rotation between an incoming supply of relatively cool fluid and an outgoing supply of relatively hot fluid.

The invention seal is of the type including an annular housing adapted to be positioned in surrounding relation to the associated shaft and defining an annular chamber around the shaft having an inboard end and an outboard end; means establishing a positive annular seal with the shaft proximate the outboard end of the chamber; means defining a leakage annular fluid seal with the shaft proximate the inboard end of the chamber; and means for delivering a pressurized fluid into the chamber between the outboard positive seal and the inboard leakage seal so as to force pressurized fluid out of the chamber past the leakage seal and preclude the entry of fluid into the chamber past the leakage seal.

According to one aspect of the invention, the positive annular fluid seal comprises annular packing means surrounding the shaft and fluid pressure means for urging the packing means into sealing engagement with the shaft. This arrangement provides an effective and simple means for providing the positive outboard seal.

According to a further feature of the invention, the annular packing means comprises a packing ring and the fluid pressure means comprises an annular bladder positioned in surrounding relation to the packing ring and constrained against radial enlargement so that the bladder expands radially inwardly in response to receipt of pressurized fluid to urge the packing ring into sealing engagement with the shaft.

According to a further feature of the invention, the housing defines a radially inwardly opening annular groove proximate the outboard end of the chamber; the packing ring is positioned in the groove with its radially inner annular surface engaging the shaft; and the bladder is positioned in the groove in surrounding relation to the packing ring with the radially inner annular surface of the bladder engaging the radially outer annular surface of the packing ring. This specific arrangement provides a compact and effective package to provide the outboard positive seal.

According to a further feature of the invention, the leakage seal includes an annular seal member positioned in surrounding relation to the shaft proximate the inboard end of the chamber with its radially inner annular surface angled toward the inboard end of the chamber. This specific arrangement facilitates a leakage flow of fluid out of the chamber to preclude unwanted entry of fluid into the chamber past the leakage seal.

According to a further feature of the invention, the seal assembly is utilized with a heat exchanger including a wheel mounted for rotation with the shaft between an incoming supply of a relatively cool fluid and an outgoing supply of a relatively hot fluid and the pressurized fluid is delivered to the annular chamber defined by the housing from one of the fluid supplies. This arrangement provides a ready and convenient source of pressurized fluid to perform the sealing function. In the disclosed embodiment of the invention the fluid is delivered to the chamber from the cool fluid supply.

According to a further feature of the invention the assembly further includes blower means to assist the flow of the incoming supply of cool fluid and the output of the blower means is arranged to deliver cool fluid to the annular chamber defined by the housing.

BRIEF DESCRIPTION OF THE INVENTION

FIG. 1 is a fragmentary schematic view showing the invention seal assembly utilized in a heat exchanger of a power plant;

Figure 2:
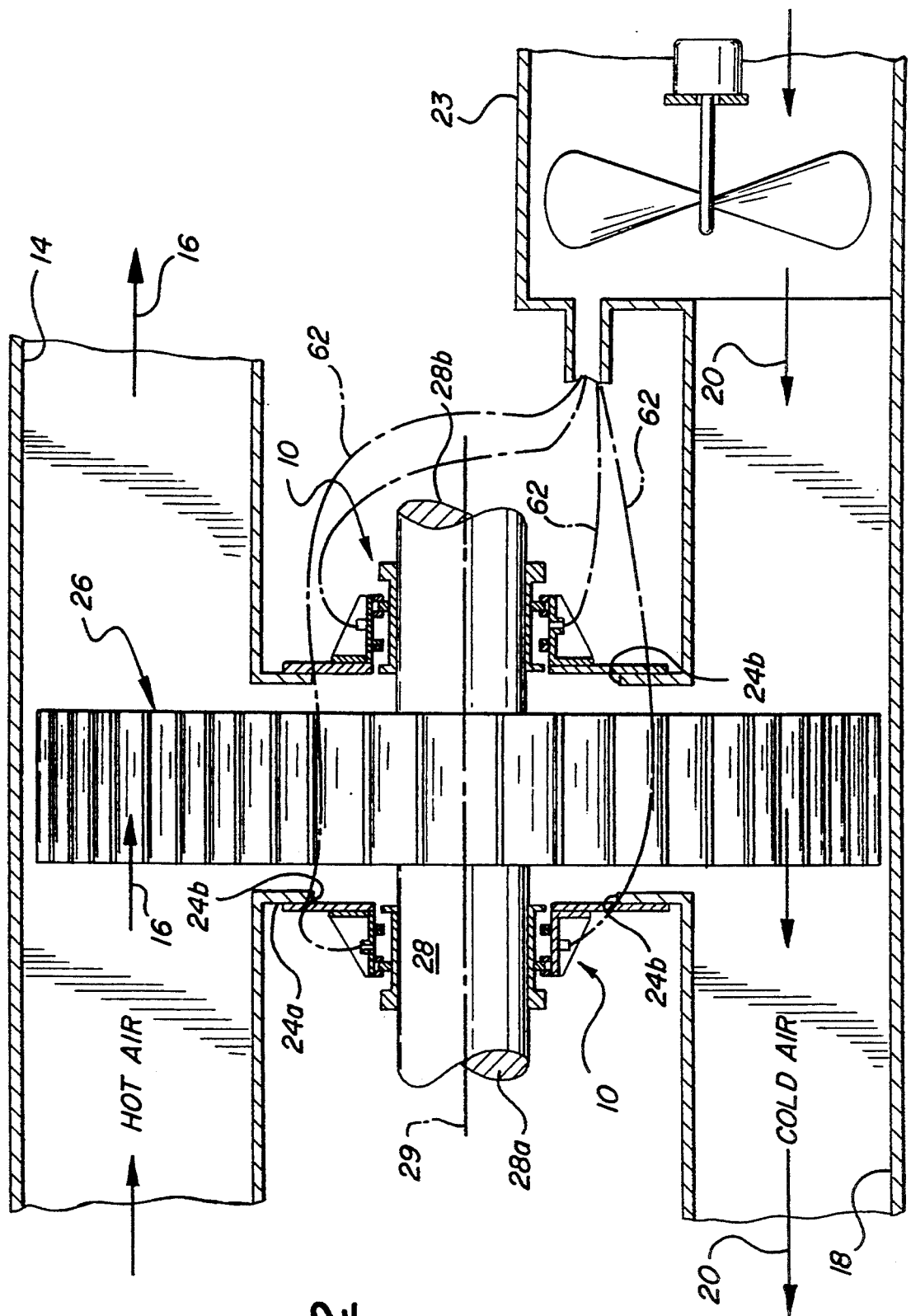
FIG. 2 is a cross sectional view taken on line 2—2 of FIG. 1.
Figure 3:
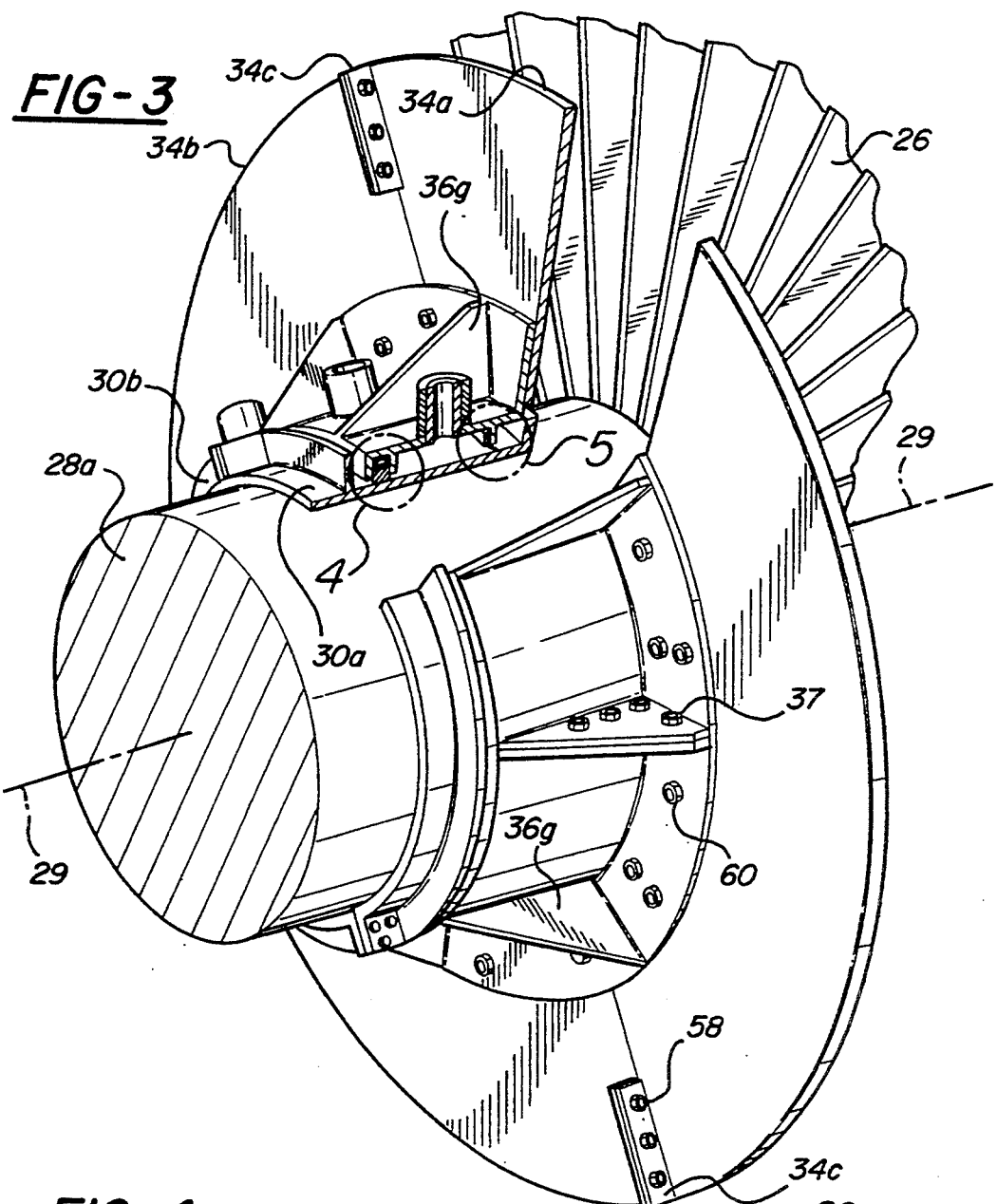
FIG. 3 is a perspective view of the invention seal assembly.
Figure 4:
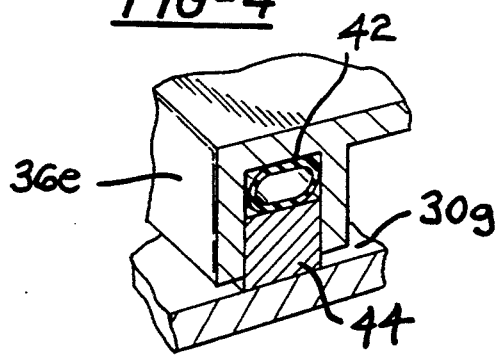
Figure 5:
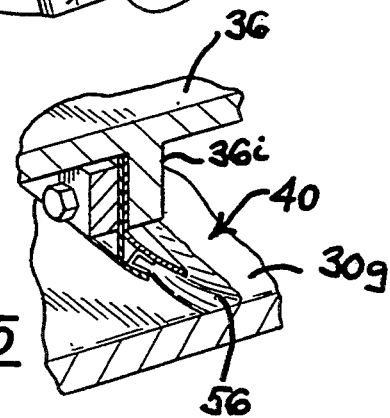

FIGS. 4 and 5 are detail views taken respectively within the circles 4 and 5 of FIG. 3;

FIG. 6 is a cross-sectional view of the invention seal assembly; and

FIGS. 7, 8 and 9 are a fragmentary views of modified seal assembly construction.

DETAILED DESCRIPTION OF THE PREFERRED EMBODIMENT

The invention seal assembly 10 is illustrated in FIG. 1 in association with a heat exchanger 12 of a power plant. The heat exchanger 12 includes a conduit 14 carrying exhaust gases 16 from the boiler of the power plant for delivery to a stack (not shown); a conduit 18 for delivery of cool incoming primary air 20 to the boiler of the power plant to assist in the combustion process and positioned for example beneath a floor 22 of the plant; a blower 23 arranged to force air under pressure through conduit 18; a rectangular housing 24 extending between the conduits 14 and 18; and a wheel 26 including a shaft 28 journalled by suitable bearing means (not shown) for rotation about a central axis 29. Shaft 28 is fixedly secured to the wheel and mounts the wheel for rotation within housing 24 about axis 29 so that each portion of the wheel moves between the hot air conduit 16 and the cool air conduit 20 as the wheel rotates to effect a heat exchange operation as between the hot combustion products and the cool incoming air. A seal assembly 10 according to the invention is provided in association with each end 28a and 28b of the shaft. Seal assemblies 10 function to preclude leakage of the hot combustion products 16 along the shaft and into the general plant environment.

Each seal assembly 10 includes a trunion sleeve assembly 30, a housing assembly 32, and a mounting plate assembly 34.

Trunion sleeve assembly 30 comprises a pair of semicircular sleeve segments 30a and 30b which, when joined together, coact to define a complete 360 sleeve assembly for encircling the respective shaft end 28a, 28b. Each segment 30a/30b includes an annular main body portion 30c, an outboard annular flange 30d, inboard clamp plates 30e, and outboard clamp plates 30f. Segments 30a/30b are positioned around the respective shaft end 28a, 28b in encircling relation to the shaft end with fasteners 31 passing through abutting outboard clamp plates 30f and through abutting inboard clamp plates 30e to firmly and positively clamp the sleeve assembly around the respective shaft end 28a, 28b for rotation with the respective shaft end. The sleeve assembly is clamped onto the respective shaft end with the inboard end of the sleeve assembly proximate the respective side face 26a of the wheel 26.

Each housing assembly 32 includes a housing 36, an outboard seal assembly 38, and an inboard seal assembly 40.

Housing 36 comprises two semi-circular housing segments 36a and 36b which are joined together in surrounding but radially outwardly spaced relation to sleeve assembly 30. Each housing segment includes an arcuate main body portion 36c; an inboard radially outwardly extending flange portion 36d; an outboard radially inwardly extending flange structure 36e defining a radially inwardly opening annular groove 36f of rectangular cross section; a plurality of circumferentially spaced triangular gussets 36g each secured at its inboard end to flange portion 36d and extending outwardly to outboard flange structure 36e; a plurality of inlets 36h each positioned between a pair of gussets 36g; and an inner arcuate ring portion 36i. Housing segments 36a and 36b are secured together utilizing fasteners 37 passing through juxtaposed gussets 36g to secure the housing in surrounding relation to the sleeve assembly. The housing, when positioned in surrounding relation to the sleeve assembly, will be seen to define an annular chamber 41 extending around the respective shaft portion 28a, 28b and having an inboard end 41a and an outboard end 41b.

Outboard seal assembly 38 includes a bladder 42 and annular packing means in the form of a packing ring 44. Bladder 42 comprises an annular inflatable member and is positioned in groove 36f of housing 36 with its outer annular surface 42a positioned against the annular surface 36j of groove 36f and with a stem 43 passing through housing 36 and communicating at its inner end 43a with the interior of bladder 42 so as to facilitate the delivery of a pressurized fluid such as pressurized air to the bladder 42. The pressurized air for bladder 42 may be provided as shop air provided by a compressor 45 and passed through a regulator 47 to lower the shop air pressure to, for example, 20 psi. Reduced pressure shop air is delivered to the stem 43 via a tube or conduit 49. Bladder 42 may be formed for example of a fabric reinforced silicon material and, specifically, may comprise a Pneuma-Seal available from Presray, Inc. of Palling, N.Y. as Type 2 PRS702.

Packing ring 44 is positioned in groove 36f with its radially outer surface 44a engaging the radially inner annular surface 42b of the bladder and with its radially inner surface 44b engaging the annular outer surface 30g of the sleeve assembly 30. Packing ring 44 has a rectangular configuration substantially conforming and filling the configuration of groove 36f and may for example comprise a heat resistant multifilament carbon yarn packing available from The Anchor Packing Co. of Warren, Mich. as Style 1332. It will be seen that, since the outer annular surface of bladder 42 is constrained against radial engagement, the delivery of pressurized air through stem 43 has the effect of moving the radially inner surface 42b of the bladder radially inwardly to compress the packing 44 and firmly press the packing into sealing engagement with the surface 30g of the sleeve assembly so as to provide a positive seal at the outboard end 41b of the chamber 41.

Inboard seal assembly 40 includes a clamp ring 46, an annular member 48, a further annular member 50, and a seal 52. Clamp ring 46 is secured to the flange portions 36i of the housing segment utilizing fasteners 53 and serves to clamp the annular members 48 and 50 between the ring 46 and flange 36i with the inner ends 48a, 50a of the annular members coacting to receive the seal 52. Seal 52 may for example be of the type available from Fuller Brush Co. of Great Bend, Kans. as Part No. 8B9065 and includes an annular clip 54 supporting an annular brush 56 in an angled position in which the radially inner annular sealing surface 56a of the brush is angled toward the inboard end 41a of the chamber 41. Brush 56 may for example be formed of a stainless steel material and is arranged to readily flex outwardly to allow the passage of air outwardly from the chamber 41 so that the seal assembly 40 comprises a leakage seal as opposed to the positive seal provided by the seal assembly 38. Alternatively, brush 56 may be formed of a felt type fabric comprising a ceramic based inorganic product such as spun ceramic fibers.

Mounting plate 34 comprises a pair of semicircular mounting plate segments 34a and 34b which are secured together by mounting flange plates 34c utilizing fasteners 58 to form a complete annular mounting plate assembly, Mounting plate assembly 34 is secured to a respective side face 24a of housing 24, as by welding, in overlying relation to an aperture 24b provided in the housing face 24a and in concentric relation to axis 29, and housing assembly 32 is secured to mounting plate assembly 34 in surrounding concentric relation to the sleeve assembly and the shaft utilizing fasteners 60.

When installed in association with the heat exchanger of the power plant, a tube or conduit 62 extends from each inlet 36h to the outlet or discharge of blower 23 so that pressurized primary air is delivered, for example, at 54 inches of water, through the inlets 36h to the chamber 41 from the blower 23. The pressurized air entering the chamber 41 is precluded from moving in an outboard direction within the chamber because of the positive seal 38 at the outboard end of the chamber and therefore seeks to escape from the chamber 41 past the leakage seal assembly 40. Since the area proximate wheel 26 is essentially at or near atmospheric pressure, a pressure differential is established across seal 56 with the result that seal 56 deflects to allow a continuous leakage flow of air from the chamber 41 past the leakage seal assembly 40 to preclude the entry of dirty, contaminated air along the shaft 28 and into the chamber 41. Since the flow of hot dirty air is precluded from entering the chamber 41 the hot dirty air is therefore precluded from entering the general environment of the power plant.

Annular brush seal 56, in addition to behaving as a leakage seal, also has the quality of packing with particulates so as to preclude the entry of particulates into chamber 41 in the event that the delivery of primary pressurized air is terminated, either deliberately or through equipment failure.

An alternate form of leakage seal 40 is seen in FIG. 7 in which the leakage seal comprises an annular angled seal 70 of relatively rigid configuration clamped between ring 46 and housing ring portion 36i and having a radially inner end 70a which is positioned in annular spaced relation to the outer surface 30g of the sleeve assembly 30 so as to provide a permanent and positive leakage path for air leaving the chamber 41.

The dimension X of the annular space between the inner edge 70a of the seal 70 and the outer surface 30g of the sleeve assembly is chosen to provide a total annular leakage area that is less than the combined inlet area provided by all of the inlets 36h so that a pressure drop is provided across the seal 70.

An alternate form of outboard seal assembly 38 is seen in FIG. 8. In the seal assembly of FIG. 8, the packing ring 44 is pressured into sealing engagement with the sleeve assembly 30 by a pair of annular coil springs 72 positioned around the outer surface 44a of the packing ring. Springs 72 have a relaxed annular diameter, seen in dashed lines in FIG. 8, substantially less than the diameter of packing ring outer surface 44a so that, when positioned around packing ring 44, the springs are stressed so as to constantly press the packing ring radially inwardly into firm sealing engagement with sleeve assembly 30.

A further alternate form of outboard seal assembly 28 is seen in FIG. 9. In the seal assembly of FIG. 9, outboard flange structure 36e includes a separate annular outboard flange plate 74 forming the outboard boundary of groove 36f and secured to the main body of the housing structure by a plurality of screw bolts 76 threadably engaged in threaded bores 36k in the housing structure, and the packing ring 44 is pressured into sealing engagement with the sleeve assembly 30 by tightening of screw bolts 76 into bores 36k. It will be seen that radially outward expansion of the packing ring is substantially precluded by the housing structure so that, as the screw bolts are tightened, plate 74 acts against the outboard face of packing ring 44 and squeezes the packing ring radially inwardly into tight, pressurized engagement with sleeve assembly 30.

The invention will be seen to provide an improved seal assembly and, more specifically, to provide an improved seal assembly which is useful in any situation wherein a rotating shaft is utilized in an assembly in which leakage along the shaft is detrimental to the environment in which the assembly is operating. More specifically, the invention provides a seal assembly that is especially suitable for use in a power plant utilizing a heat exchanger of the type including a rotating wheel performing the heat exchange operation between hot combustion products leaving the boiler of the plant and cool incoming air being delivered to the boiler. In this situation, the invention seal assembly provides a simple, inexpensive and effective arrangement for precluding leakage of hot dirty combustion products along the shaft of the wheel and into the general environment of the plant.

Whereas preferred embodiments of the invention have been illustrated and described in detail, it will be apparent that various changes may be made in the disclosed embodiments without departing from the scope or spirit of the invention.

We claim:

1. A seal assembly for a rotating shaft comprising an annular housing adapted to be positioned in surrounding relation to the shaft and defining an annular chamber around the shaft having an inboard end and an outboard end; means establishing a positive annular fluid seal with the shaft proximate the outboard end of the chamber; means defining a leakage annular fluid seal with the shaft proximate the inboard end of the chamber; and means for delivering pressurized fluid into the chamber between the outboard positive seal and the inboard leakage seal so as to force pressurized fluid outwardly past the leakage seal and preclude the entry of fluid into the chamber past the leakage seal, characterized in that:

the positive annular fluid seal comprises a packing ring surrounding the shaft proximate the outboard end of the chamber and an annular bladder positioned in surround relation to the packing ring and constrained against radial expansion so that the bladder expands radially inwardly in response to receipt of pressurized fluid to urge the packing ring into sealing engagement with the shaft; and the leakage seal comprises an annular brush seal positioned in surrounding relation to the shaft proximate the inboard end of the housing with its radially inner annular surface angled toward the inboard end of the chamber and arranged to flex upwardly in response to pressurized fluid in the chamber to force pressurized fluid outwardly past the leakage seal and preclude the entry of fluid into the chamber past the leakage seal.

2. A seal assembly according to claim 1 wherein:

the housing defines a radially inwardly opening annular groove proximate the outboard end of the chamber; and the packing ring is positioned in the groove with its radially inner annular surface engaging the shaft.

3. A seal assembly according to claim 2 wherein:

the groove is defined in part by an annular outboard plate; and the pressure means comprises means mounting the outboard plate for inboard movement relative to the housing to squeeze the packing ring radially inwardly into sealing engagement with the shaft.

4. A seal assembly according to claim 1 wherein:

the housing defines a radially inwardly opening annular groove proximate the outboard end of the chamber;

the packing ring is positioned in the groove with its radially inner annular surface engaging the shaft; and the bladder is positioned in the groove in surrounding relation to the packing ring with the radially inner annular surface of the bladder engaging the radially outer annular surface of the packing ring.

5. A seal assembly according to claim 4 wherein:

the seal assembly further includes a stem extending through the housing and opening at its inner end in the bladder to facilitate the delivery of pressurized fluid to the bladder.

6. A seal assembly according to claim 5 wherein:

the packing ring comprises a multi-filament yarn packing.

7. A seal assembly according to claim 1 wherein:

the seal assembly further includes pressure means comprising at least one annular spring positioned in surrounding relation to the packing ring.

8. A seal assembly according to claim 1 wherein: the seal assembly further includes pressure means comprising means for squeezing the packing ring radially inwardly into sealing engagement with the shaft.

* * * * *